US012169061B2

(12) United States Patent
Tang et al.

(10) Patent No.: US 12,169,061 B2
(45) Date of Patent: Dec. 17, 2024

(54) LAMP UNIT, CONNECTOR AND LAMP SYSTEM

(71) Applicant: SAVANT TECHNOLOGIES LLC, East Cleveland, OH (US)

(72) Inventors: Fangru Tang, Shanghai (CN); Aijun Wang, Shanghai (CN); Zhiyong Wang, Shanghai (CN); Hongbin Xu, Shanghai (CN); Yang Lu, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/497,495

(22) Filed: Oct. 30, 2023

(65) Prior Publication Data

US 2024/0142096 A1 May 2, 2024

(30) Foreign Application Priority Data

Nov. 1, 2022 (CN) ......................... 202222919690.3

(51) Int. Cl.
*F21V 23/06* (2006.01)
*F21V 19/00* (2006.01)
*F21Y 115/10* (2016.01)

(52) U.S. Cl.
CPC ............ *F21V 23/06* (2013.01); *F21V 19/004* (2013.01); *F21Y 2115/10* (2016.08)

(58) Field of Classification Search
CPC ..... F21V 23/06; F21V 19/004; F21Y 2115/10
See application file for complete search history.

(56) References Cited

U.S. PATENT DOCUMENTS 7,108,392 B2 9/2006 Strip et al.
10,088,139 B2 10/2018 Liang
11,567,394 B1 * 1/2023 Ernest .................... G03B 15/06
2007/0283655 A1 * 12/2007 Tobin .................. A61N 5/0616 52/478

(Continued)

FOREIGN PATENT DOCUMENTS

CN 216773611 U 6/2022
CN 217899782 U * 11/2022

OTHER PUBLICATIONS

English translation of Huang CN-217899782-U, published Nov. 2022 (Year: 2022).*

*Primary Examiner* — Evan P Dzierzynski
(74) *Attorney, Agent, or Firm* — WOOD IP LLC

(57) ABSTRACT

Provided is a lamp unit, a connector, and a lamp system having the lamp unit that includes a lamp panel, a connector having a rotating shaft, and a first connection portion and a second connection portion each being sleeved on the rotating shaft in a hinge form and being rotatable relative to each other around the rotating shaft, and connection ports detachably snap-fitted with one of the first connection portion and the second connection portion. The relative angle between the first connection portion and the second connection portion can be adjusted after the lamp units are connected in a three-dimensional manner via the connectors. In addition, one of the first connection portion and the second connection portion of each connector is detachably snap-fitted with a connection port of each lamp unit, which can make the connection between the lamp units more secure while ensuring convenient assembly and disassembly.

18 Claims, 10 Drawing Sheets

(56) References Cited

U.S. PATENT DOCUMENTS

| | | | | |
|---|---|---|---|---|
| 2010/0000953 | A1* | 1/2010 | Shew | H05K 7/1401 211/183 |
| 2015/0363017 | A1* | 12/2015 | Sitbon | G06F 1/1601 361/679.21 |
| 2022/0283608 | A1* | 9/2022 | Xianyu | H04M 1/022 |
| 2022/0400562 | A1* | 12/2022 | Wang | G06F 1/1681 |
| 2023/0094599 | A1* | 3/2023 | Xu | G06F 1/1679 361/679.27 |

* cited by examiner

LAMP UNIT, CONNECTOR AND LAMP SYSTEM

CROSS-REFERENCE TO RELATED APPLICATIONS

This application claims the benefit of Chinese Patent Application Serial Number 202222919690.3, filed Nov. 1, 2022, which is incorporated herein by reference.

FIELD OF TECHNOLOGY

The present disclosure relates to the field of lamps. In particular, the present disclosure relates to a lamp unit, a connector, and a lamp system.

BACKGROUND

LED panel lamps can form specific light-emitting patterns and light-emitting effects by means of assembly and combination.

In the prior art, the LED panel lamps cannot achieve three-dimensional assembling, or even if three-dimensional assembling can be achieved, a three-dimensional stereoscopic shape formed thereby cannot be maintained persistently, and the assembling effect is relatively loose.

In addition, in the prior art, when planar assembling is performed on the LED panel lamps, the LED panel lamps need to be assembled one by one at a predetermined mounting position (for example, a wall surface), so as to form a plane shape. In this process, an operator may need to assemble the LED panel lamps one by one at a height higher than the ground, and the operation process is relatively troublesome.

In view of this, it is desirable to provide a lamp unit and a lamp system that can achieve a stable three-dimensional stereoscopic shape and/or convenient planar assembling, to address the described technical problems.

SUMMARY

An object of the present disclosure is to provide a lamp unit, a connector and a lamp system, which can achieve a stable three-dimensional stereoscopic shape and/or convenient planar assembling, so that the light-emitting patterns formed after the lamp units are assembled are more abundant, the light-emitting effect of the lamp units is improved, and the planar assembling of the lamp units is more convenient.

According to one embodiment of the present disclosure, a lamp unit, comprising: a lamp panel; a connector, the connector comprising: a rotating shaft; and a first connection portion and a second connection portion, the first connection portion and the second connection portion being sleeved on the rotating shaft in a hinge form and being rotatable relative to each other around the rotating shaft; and connection ports, provided on the lamp panel and configured to be detachably snap-fitted with one of the first connection portion and the second connection portion.

By configuring the first connection portion and the second connection portion of the connector to be on the rotating shaft in a hinge form and to be rotatable relative to each other around the rotating shaft, the relative angle between the first connection portion and the second connection portion can be adjusted after a plurality of lamp units are connected in a three-dimensional manner via the connectors, so that a three-dimensional stereoscopic shape of the lamp units can be flexibly changed. In addition, one of the first connection portion and the second connection portion of each connector is detachably snap-fitted with a connection port of each lamp unit, which can make the connection between the lamp units more secure while ensuring convenient assembly and disassembly.

In the lamp unit according to one embodiment of the present disclosure, the first connection portion and the second connection portion each comprise sleeves for accommodating the rotating shaft.

In this way, a connection form between the first connection portion and the second connection portion, and the rotating shaft is provided.

In the lamp unit according to one embodiment of the present disclosure, the first connection portion comprises: a first plate; and n sleeves, spaced apart at predetermined intervals and arranged on one end of the first plate, the first connection portion being sleeved on the rotating shaft via the n sleeves, and the second connection portion comprises: a second plate; and n−1 sleeves, spaced apart at predetermined intervals and arranged on one end of the second plate, wherein the n−1 sleeves are sleeved on the rotating shaft in a manner of being respectively embedded in n−1 intervals formed by then sleeves of the first connection portion, where n is greater than or equal to 3.

The n−1 sleeves of the second connection portion are sleeved on the rotating shaft in a manner of being respectively embedded in n−1 intervals formed by the n sleeves of the first connection portion, which increases the contact area between the sleeves of the first connection portion and the second connection portion, and increases the rotation damping of the first connection portion and the second connection portion rotating around the rotating shaft, so that when three-dimensional assembling is performed on a plurality of lamp units, a three-dimensional stereoscopic shape can be maintained persistently and stably, thereby achieving an excellent three-dimensional assembling effect.

In the lamp unit according to one embodiment of the present disclosure, the connector further comprises gaskets arranged between ends of the rotating shaft and the outermost sleeves of the n sleeves of the first connection portion.

The gaskets are further arranged between the ends of the rotating shaft and the outermost sleeves of the first connection portion, the contact pressure between the end faces of the sleeves can be maintained, and thus the rotation damping of the first connection portion and the second connection portion rotating around the rotating shaft is maintained without reduction, so that when three-dimensional assembling is performed on a plurality of lamp units, a three-dimensional stereoscopic shape can be further stably maintained.

In the lamp unit according to one embodiment of the present disclosure, the first plate has a first face and a second face opposite each other and has a first opening in the middle of the plate, and the second plate has a first face and a second face opposite each other and has a second opening in the middle of the plate; the connector further comprises a flexible assembly, wherein a first end and a second end of the flexible assembly are respectively provided with metal contacts, wherein the first end of the flexible assembly passes through the first opening from the first face of the first plate to the second face of the first plate, so that the metal contacts on the first end of the flexible assembly are located on the second face of the first plate, and the second end of the flexible assembly passes through the second opening from the first face of the second plate to the second face of the second plate, so that the metal contacts on the second end of the flexible assembly are located on the second face of the second plate.

By means of the described method, an arrangement form in which the metal contacts of the flexible assembly are located on the connector is provided.

In the lamp unit according to one embodiment of the present disclosure, each connection port comprises metal springs provided therein, when the connection port is connected to one of the first connection portion and the second connection portion, the metal springs are electrically coupled to the metal contacts on the first connection portion or the metal contacts on the second connection portion.

By means of the electrical coupling formed by the metal contacts of the flexible assembly and the metal springs arranged in the connection port, when a plurality of lamp units are assembled, electrical connection between the plurality of lamp units is achieved.

In the lamp unit according to one embodiment of the present disclosure, a first accommodating groove closely adjacent to the first opening is provided on the second face of the first plate, for accommodating the first end, passing through the first opening, of the flexible assembly, and a second accommodating groove closely adjacent to the second opening is provided on the second face of the second plate, for accommodating a second end, passing through the second opening, of the flexible assembly.

The first end and the second end of the flexible assembly are accommodated by providing accommodating grooves on the second faces of the first plate and the second plate, so that the surfaces of the first end and the second end of the flexible assembly after being accommodated in the accommodating grooves are substantially flush with the surfaces of the second faces of the first plate and the second plate, thereby ensuring that the connector is smoothly snap-fitted with the connection port.

In the lamp unit according to one embodiment of the present disclosure, the first plate is provided with a first recess at the other end opposite the end provided with the n sleeves on the first face, and the second plate is provided with a second recess at the other end opposite the end provided with the n−1 sleeves on the first face; and the connection port is provided with a bump, and when the connection port is connected to one of the first connection portion and the second connection portion, the bump is snap-fitted with the first recess or the second recess.

By means of the described method, a specific form of snap-fit connection between the first connection portion or the second connection portion of the connector and the connection port is provided, and by means of snap-fit connection between the bump and the recess, secure connection between a plurality of lamp units can be achieved.

In the lamp unit according to one embodiment of the present disclosure, the connection port is further provided with a warping piece located outside the bump, and when detaching the first connection portion or the second connection portion from the connection port, the snap-fit connection between the bump and the first recess or the second recess is separated by lifting the warping piece upward.

By providing the warping piece, the connector and the connection port can be conveniently and quickly assembled and disassembled.

In the lamp unit according to one embodiment of the present disclosure, the first plate is provided with a first screw hole at the end where the first notch is provided, and the second plate is provided with a second screw hole at the end where the second notch is provided.

By means of the screw holes provided on the connectors, the lamp units can be suspended to a predetermined position, thereby stabilizing the connection between the lamp units and the predetermined position.

In the lamp unit according to one embodiment of the present disclosure, the lamp panel comprises: a light-emitting plate; and a back plate, arranged opposite the light-emitting plate, wherein the connection ports are provided on the back plate.

By means of the described method, a specific arrangement form of connection ports is provided.

According to another embodiment of the present disclosure, a connector is provided, comprising: a rotating shaft; a first connection portion and a second connection portion, the first connection portion and the second connection portion being sleeved on the rotating shaft in a hinge form and being rotatable relative to each other around the rotating shaft; and metal contacts, arranged on the first connection portion and the second connection portion, respectively.

The first connection portion and the second connection portion of the connector are provided on the rotating shaft in a hinge form and are rotatable relative to each other around the rotating shaft, the relative angle between the first connection portion and the second connection portion can be adjusted, for example after a plurality of lamp units are connected in a three-dimensional manner via the connectors, so that a three-dimensional stereoscopic shape of the lamp units can be flexibly changed.

In the connector according to another embodiment of the present disclosure, the first connection portion and the second connection portion each comprise sleeves for accommodating the rotating shaft.

In this way, a connection form between the first connection portion and the second connection portion, and the rotating shaft is provided.

In the connector according to another embodiment of the present disclosure, the first connection portion comprises: a first plate; and n sleeves, spaced apart at predetermined intervals and arranged on one end of the first plate, the first connection portion being sleeved on the rotating shaft via the n sleeves, and the second connection portion comprises: a second plate; and n−1 sleeves, spaced apart at predetermined intervals and arranged on one end of the second plate, wherein the n−1 sleeves are sleeved on the rotating shaft in a manner of being respectively embedded in n−1 intervals formed by then sleeves of the first connection portion, where n is greater than or equal to 3.

The n−1 sleeves of the second connection portion are sleeved on the rotating shaft in a manner of being respectively embedded in n−1 intervals formed by the n sleeves of the first connection portion, which increases the contact area between the sleeves of the first connection portion and the second connection portion, and increases the rotation damping of the first connection portion and the second connection portion rotating around the rotating shaft, so that when three-dimensional assembling is performed on a plurality of lamp units by using the connectors, a three-dimensional stereoscopic shape can be maintained persistently and stably, thereby achieving an excellent three-dimensional assembling effect.

In the connector according to another embodiment of the present disclosure, the connector further comprises gaskets arranged between ends of the rotating shaft and the outermost sleeves of the n sleeves of the first connection portion.

The gaskets are further arranged between the ends of the rotating shaft and the outermost sleeves of the first connection portion, the contact pressure between the end faces of the sleeves can be maintained, and thus the rotation damping of the first connection portion and the second connection portion rotating around the rotating shaft is maintained without reduction, so that when three-dimensional assembling is performed on a plurality of lamp units by using the connectors, a three-dimensional stereoscopic shape can be further stably maintained.

In the connector according to another embodiment of the present disclosure, the first plate has a first face and a second face opposite each other and has a first opening in the middle of the plate, and the second plate has a first face and a second face opposite each other and has a second opening in the middle of the plate; the connector further comprises a flexible assembly, wherein a first end and a second end of the flexible assembly are respectively provided with metal contacts, wherein the first end of the flexible assembly passes through the first opening from the first face of the first plate to the second face of the first plate, so that the metal contacts on the first end of the flexible assembly are located on the second face of the first plate, and the second end of the flexible assembly passes through the second opening from the first face of the second plate to the second face of the second plate, so that the metal contacts on the second end of the flexible assembly are located on the second face of the second plate.

By means of the described method, an arrangement form in which the metal contacts of the flexible assembly are located on the connector is provided.

In the connector according to another embodiment of the present disclosure, a first accommodating groove closely adjacent to the first opening is provided on the second face of the first plate, for accommodating the first end, passing through the first opening, of the flexible assembly, and a second accommodating groove closely adjacent to the second opening is provided on the second face of the second plate, for accommodating a second end, passing through the second opening, of the flexible assembly.

The first end and the second end of the flexible assembly are accommodated by providing accommodating grooves on the second faces of the first plate and the second plate, so that the surfaces of the first end and the second end of the flexible assembly after being accommodated in the accommodating grooves are substantially flush with the surfaces of the second faces of the first plate and the second plate, thereby ensuring that the connector is smoothly snap-fitted with the connection port of the lamp unit, for example.

In the connector according to another embodiment of the present disclosure, the first plate is provided with a first recess at the other end opposite the end provided with the n sleeves on the first face, and the second plate is provided with a second recess at the other end opposite the end provided with the n−1 sleeves on the first face.

By means of the described method, a specific arrangement form of the recess on the first connection portion or the second connection portion of the connector is provided.

In the connector according to another embodiment of the present disclosure, the first plate is provided with a first screw hole at the end where the first notch is provided, and the second plate is provided with a second screw hole at the end where the second notch is provided.

By means of the screw holes provided on the connectors, the lamp units for example can be suspended to a predetermined position, thereby stabilizing the connection between the lamp units and the predetermined position.

According to still another embodiment of the present disclosure, a lamp system is provided, comprising a plurality of lamp units, wherein each lamp unit comprises: a lamp panel; a connector, the connector comprising: a rotating shaft; and a first connection portion and a second connection portion, the first connection portion and the second connection portion being sleeved on the rotating shaft in a hinge form and being rotatable relative to each other around the rotating shaft; and connection ports, provided on the lamp panel and configured to be detachably snap-fitted with one of the first connection portion and the second connection portion, wherein the plurality of lamp units are connected to one other by means of the connectors.

By configuring the first connection portion and the second connection portion of the connector to be on the rotating shaft in a hinge form and to be rotatable relative to each other around the rotating shaft, the relative angle between the first connection portion and the second connection portion can be adjusted after a plurality of lamp units are connected in a three-dimensional manner via the connectors, so that a three-dimensional stereoscopic shape of the lamp units can be flexibly changed. In addition, one of the first connection portion and the second connection portion of each connector is detachably snap-fitted with a connection port of each lamp unit, which can make the connection between the lamp units more secure while ensuring convenient assembly and disassembly.

BRIEF DESCRIPTION OF THE DRAWINGS

The drawings illustrated herein are used for providing further understanding of the present disclosure and constitute a part of the present disclosure, and the illustrative embodiments of the present disclosure and illustrations thereof are used for explaining the present disclosure, rather than constituting inappropriate limitation on the present disclosure. In the drawings.

DETAILED DESCRIPTION

In order to enable a person skilled in the art to understand the solutions of the present disclosure better, hereinafter, the technical solutions in the embodiments of the present disclosure will be described clearly and thoroughly with reference to the accompanying drawings of embodiments of the present disclosure. Obviously, the embodiments as described are only some of embodiments of the present disclosure, and are not all the embodiments. On the basis of the embodiments in the present disclosure, all other embodiments obtained by a person of ordinary skill in the art without any inventive effort shall all fall within the scope of protection of the present disclosure.

Figure 1:
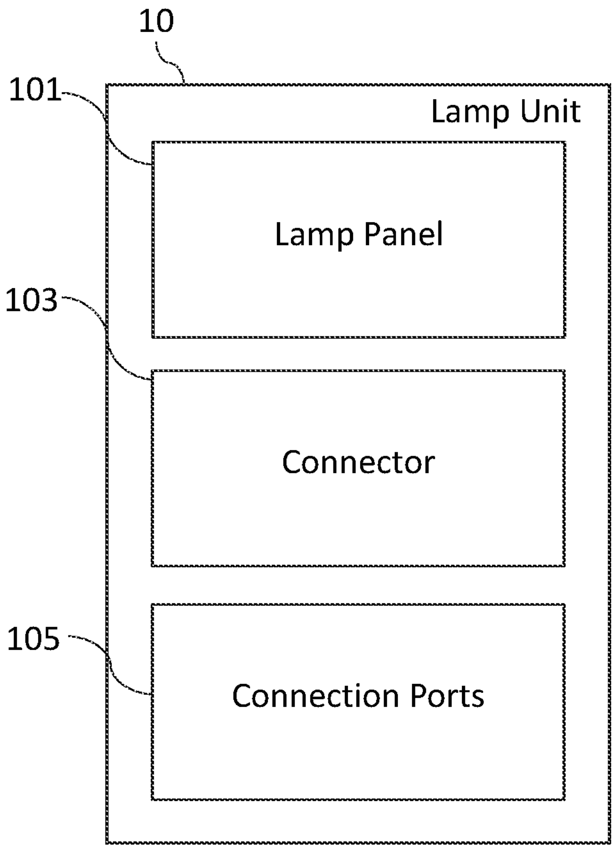
FIG. 1 shows a block diagram of a lamp unit according to embodiments of the present disclosure.
Figure 2:
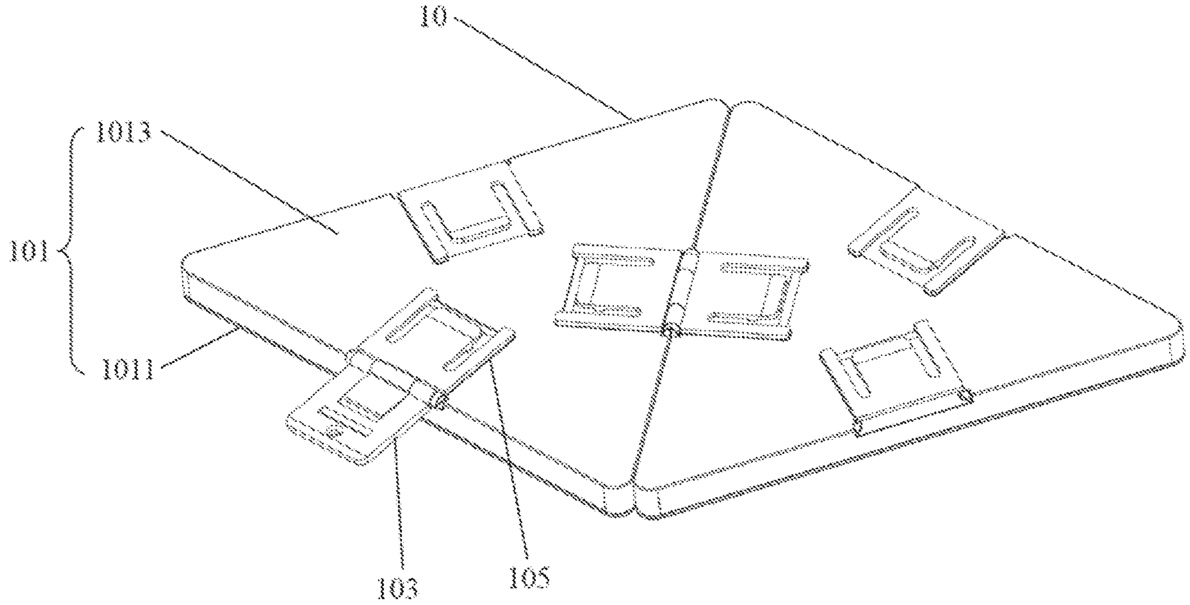
FIG. 2 shows a schematic overall external view of lamp units according to embodiments of the present disclosure.
Figure 3A:
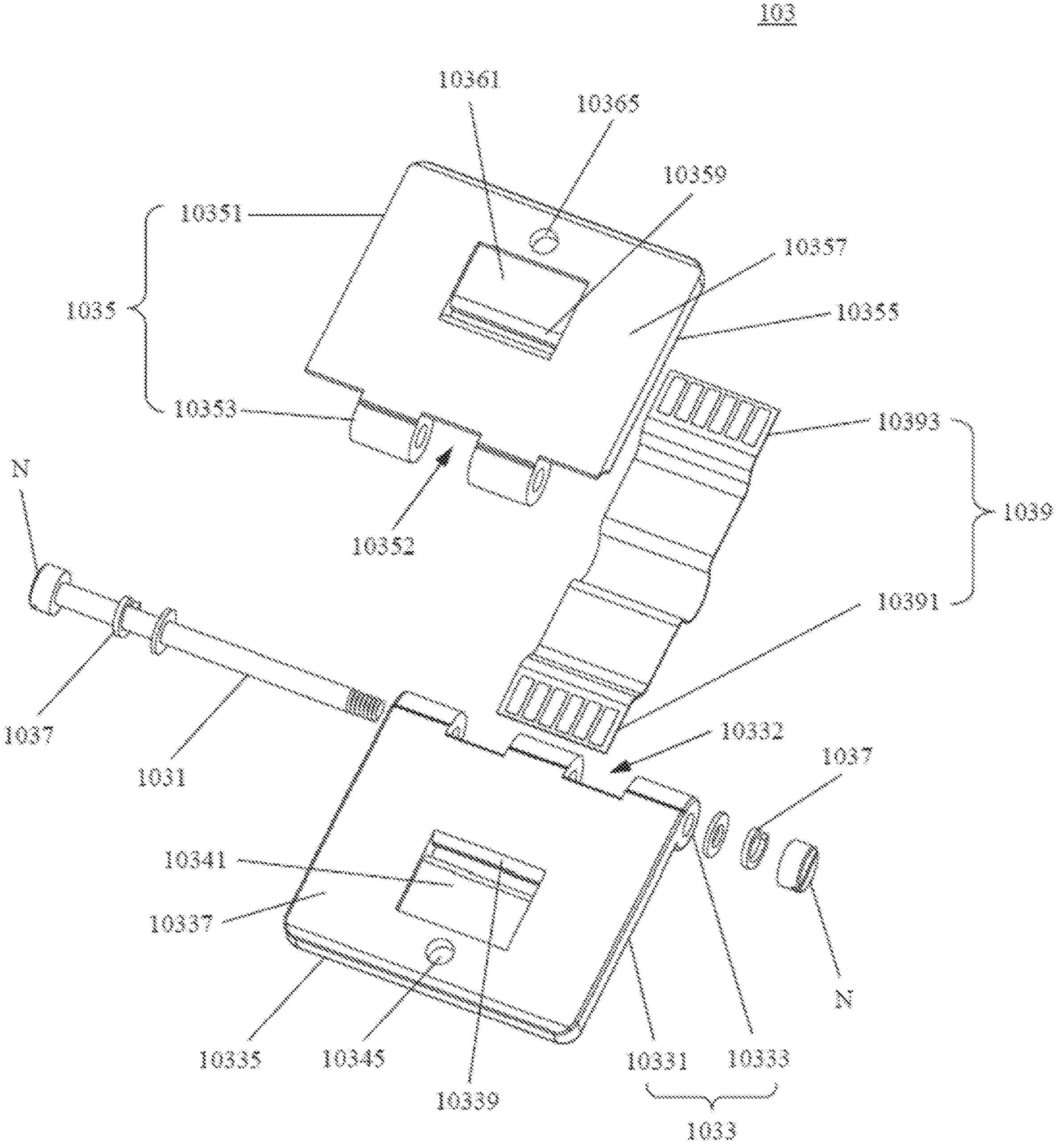
FIGS. 3*a*-3*c* show a view of a connector in a lamp unit.
Figure 3B:
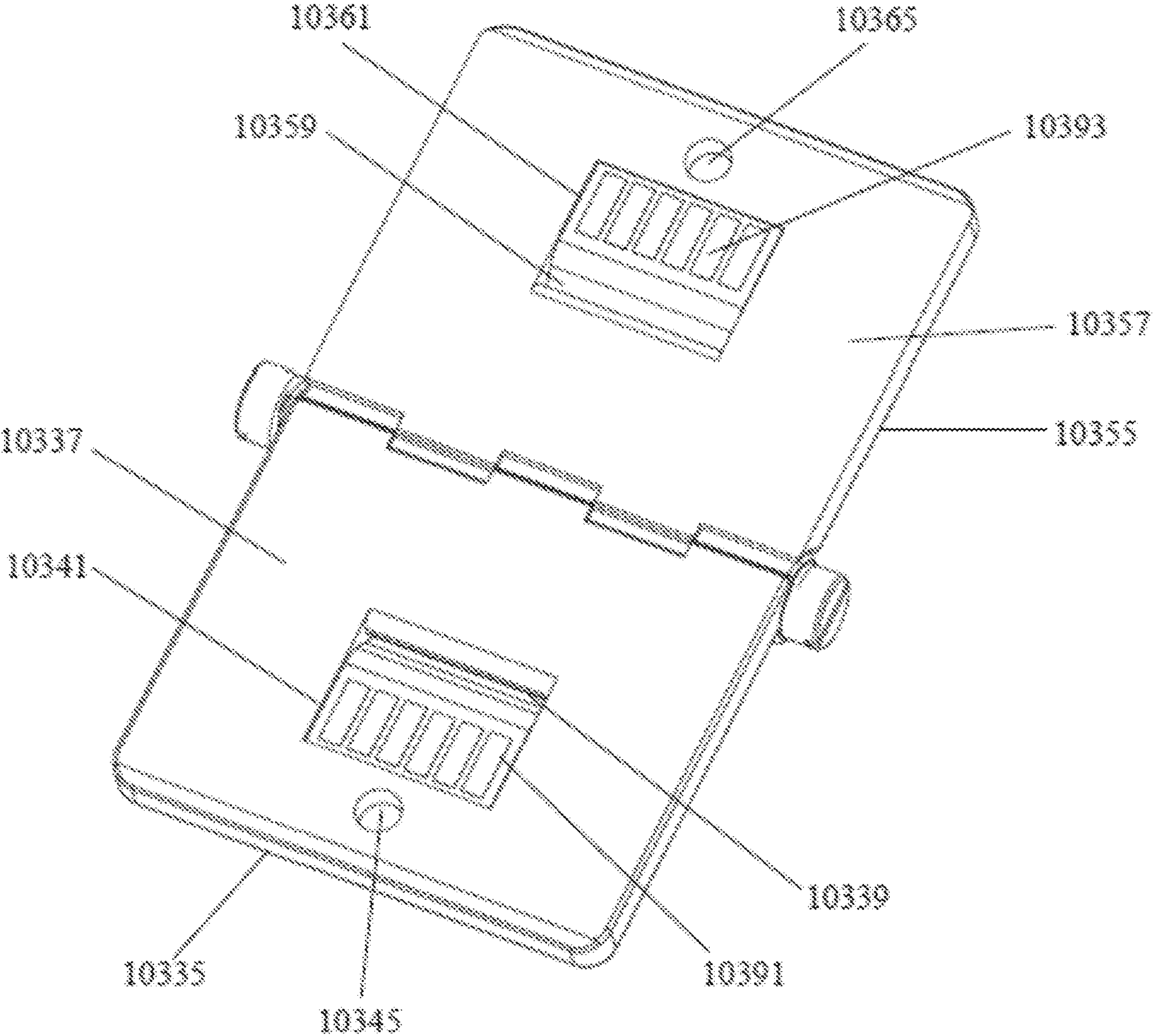
Figure 3C:
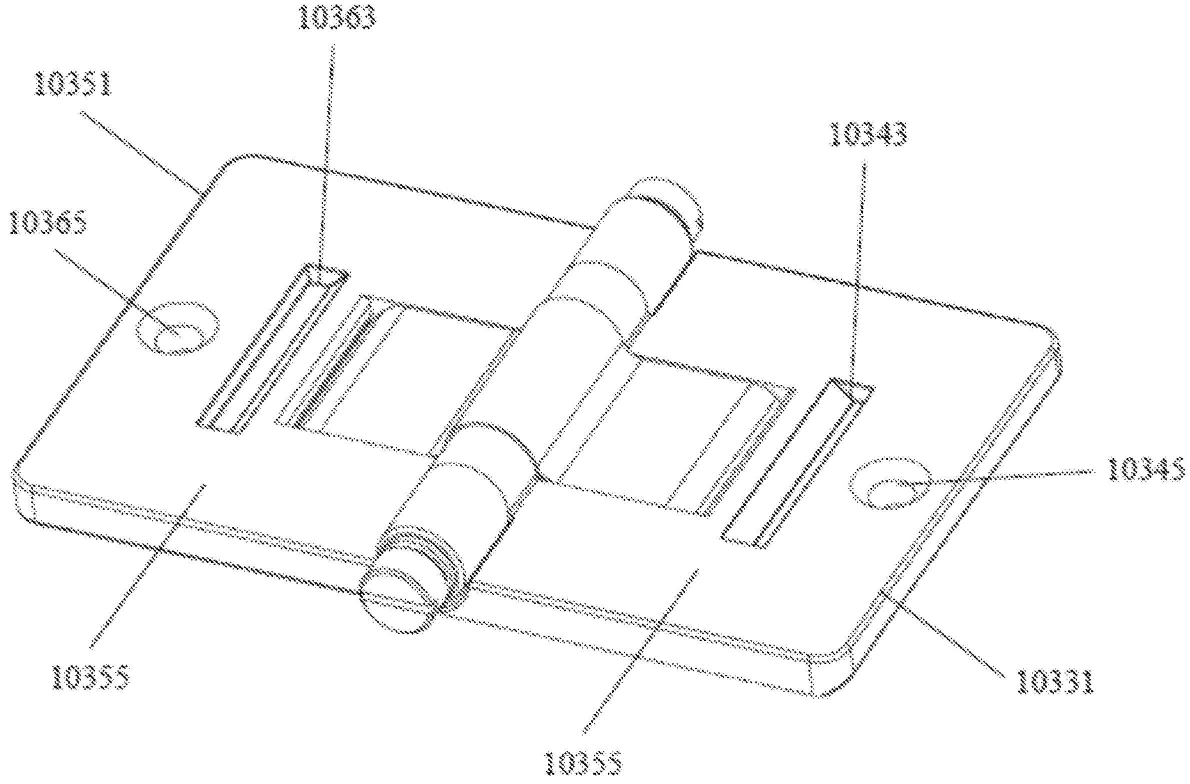
Figure 4:
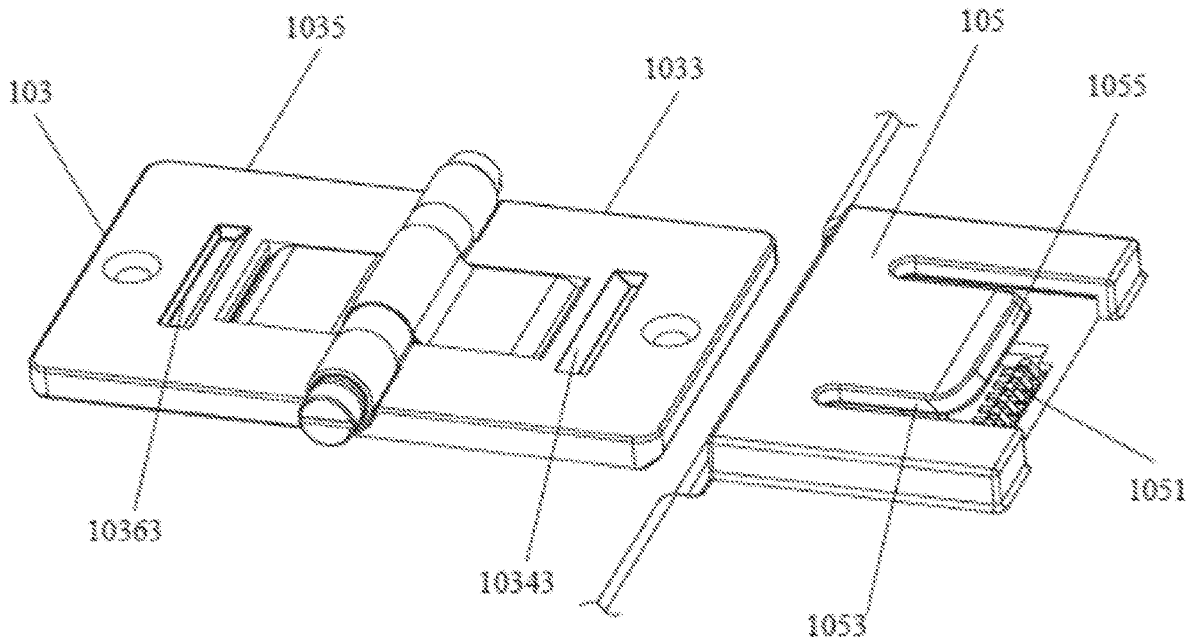
FIG. 4 shows a schematic diagram in which a connector in a lamp unit is connected to a connection port.
Figure 5:
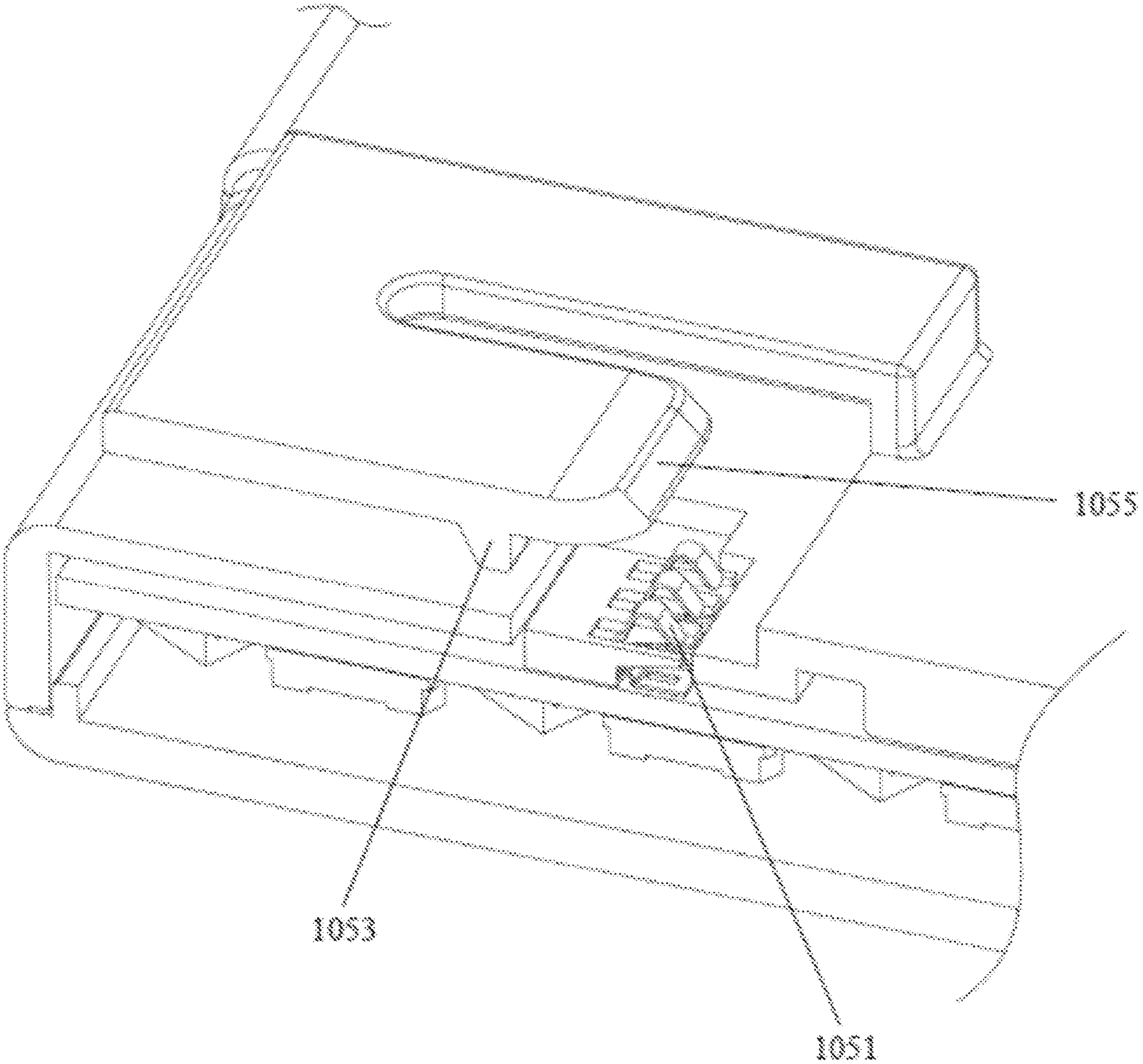
FIG. 5 shows a sectional view of a connection port in a lamp unit.

According to embodiments of the present disclosure, a lamp unit is provided. FIG. 1 shows a block diagram of a lamp unit according to embodiments of the present disclosure. FIG. 2 shows a schematic overall external view of lamp units according to embodiments of the present disclosure. In FIG. 2, for ease of understanding, two lamp units connected together by means of a connector are shown. FIGS. 3*a*-3*c* show a view of a connector in a lamp unit, in which FIG. 3*a* is an exploded perspective view of the connector, FIG. 3*b* is a front-face external view of the connector, and FIG. 3*c* is a back-face external view of the connector. FIG. 4 shows a schematic diagram in which a connector in a lamp unit is connected to a connection port. FIG. 5 shows a sectional view of a connection port in a lamp unit. Hereinafter, the lamp unit according to embodiments of the present disclosure is described in conjunction with FIGS. 1-5.

The lamp unit 10 can comprise a lamp panel 101, a connector 103, and connection ports 105.

The lamp panel 101 may comprise a light-emitting plate 1011 and a back plate 1013 arranged opposite the light-emitting plate 1011, and light generated in the lamp unit 10 can be emitted from the light-emitting plate 1011.

The connector 103 may comprise a rotating shaft 1031, a first connection portion 1033 and a second connection portion 1035; the first connection portion 1033 and the second connection portion 1035 are sleeved on the rotating shaft 1031 in a hinge form and can rotate relative to each other around the rotating shaft 1031.

The connection ports 105 are provided on the lamp panel 101 and are configured to be detachably snap-fitted with one of the first connection portion 1033 and the second connection portion 1035.

The first connection portion 1033 and the second connection portion 1035 each comprise sleeves for accommodating the rotating shaft 1031.

Specifically, the first connection portion 1033 comprises a first plate 10331 and n sleeves 1033, where n is greater than or equal to 3. For simplicity, FIG. 3*a* shows that the first connection portion 1033 comprises three sleeves 10333, but the present disclosure is not limited thereto, and more sleeves may be provided as needed.

As shown in FIG. 3*a*, the three sleeves 10333 are spaced apart at predetermined intervals and arranged at one end of the first plate 10331, and the first connection portion 1033 can be sleeved on the rotating shaft 1031 via these three sleeves 10333.

The second connection portion 1035 comprises a second plate 10351 and n−1 sleeves 10353. For simplicity, FIG. 3*a* shows that the second connection portion 1035 comprises two sleeves 10353, but the present disclosure is not limited thereto, and more sleeves may be provided as needed.

As shown in FIG. 3*a*, the two sleeves 10353 of the second connection portion 1035 are spaced apart at a predetermined interval and arranged at one end of the second plate 10351, and the two sleeves 10353 are sleeved on the rotating shaft 1031 in a manner that the two sleeves are respectively embedded in two intervals formed by the three sleeves 10333 of the first connection portion 1033.

Specifically, two intervals 10332 are formed between the three spaced apart sleeves 10333 of the first connection portion 1033, and one interval 10352 is formed between the two spaced apart sleeves 10353 of the second connection portion 1035; the two spaced apart sleeves 10353 of the second connection portion 1035 are respectively embedded in the two intervals 10332 of the first connection portion 1033, and the middle sleeve among the three sleeves 10333 of the first connection portion 1033 is embedded in the interval 10352 of the second connection portion. Thus, the sleeves of the first connection portion 1033 and the second connection portion 1035 are mutually embedded in a crossed manner. The rotating shaft 1031 passes through the sleeves 10333 and 10353, to connect the first connection portion 1033 and the second connection portion 1035 in a hinge form. The first connection portion 1033 and the second connection portion 1035 can rotate relative to each other around the rotating shaft 1031, to form a desired angle between the first connection portion 1033 and the second connection portion 1035.

As shown in FIG. 3*a*, the connector 103 may further comprise gaskets 1037, the gaskets 1037 are preferably arranged between ends of the rotating shaft 1031 and the outermost sleeves among the three sleeves 10333 of the first connection portion 1033. Specifically, FIG. 3*a* shows that two gaskets 1037 are arranged between the left end of the rotating shaft 1031 and the leftmost sleeve of the first connection portion 1033, and two gaskets 1037 are arranged between the right end of the rotating shaft 1031 and the rightmost sleeve of the first connection portion 1033.

The rotating shaft 1031 may be a rod-shaped component with threads at two ends and with a smooth middle part. Two nuts N are respectively screwed onto the threads from the left end and the right end of the rotating shaft 1031, so that the gaskets 1037 can be respectively embedded between the two ends of the rotating shaft and the outermost sleeves of the first connection portion 1033. Note that the gaskets 1037 here are annular sheet-shaped components each having an opening in the middle, and the gaskets 1037 are sleeved on the rotating shaft 1031 through the openings in the middle.

Herein, it is described that the rotating shaft 1031 is a rod-shaped component with threads at two ends and with a smooth middle part. However, the present disclosure is not limited thereto, and the rotating shaft 1031 may be a rod-shaped component with one end fixed by a fixing component and the other end provided with threads, and with a smooth middle part. The rotating shaft 1031 may also have various other forms, as long as the rotating shaft can achieve the effect of the described rotating shaft.

As shown in FIG. 3*a*, the first plate 10331 has a first face 10335 and a second face 10337 opposite the first face 10335, and a first opening 10339 is provided through the first plate 10331 in the middle of the first plate 10331. A first accommodating groove 10341 closely adjacent to the first opening 10339 is provided on the second face 10337 of the first plate 10331.

The second plate 10351 has a first face 10355 and a second face 10357 opposite the first face 10355, and a second opening 10359 is provided through the second plate 10351 in the middle of the second plate 10351. A second accommodating groove 10361 closely adjacent to the second opening 10359 is provided on the second face 10357 of the second plate 10351.

The connector 103 further comprises a flexible assembly 1039, the flexible assembly may be a flexible circuit board. A first end 10391 and a second end 10393 of the flexible assembly 1039 are respectively provided with metal contacts. The metal contacts herein are preferably gold fingers, but the present disclosure is not limited thereto, and the metal contacts may also be, for example, tin fingers.

As shown in FIG. 3*a*, the first end 10391 of the flexible assembly 1039 passes through the first opening 10339 from the first face 10335 to the second face 10337 of the first plate 10331, so that the metal contacts on the first end 10391 of the flexible assembly 1039 are located on the second face 10337 of the first plate 10331. More specifically, as shown in FIG. 3*b*, the first end 10391 of the flexible assembly 1039 is accommodated in the first accommodating groove 10341 on the second face 10337 of the first plate 10331, and the metal contacts on the first end 10391 are exposed to the outside of the first plate 10331 in the first accommodating groove 10341.

The second end 10393 of the flexible assembly 1039 passes through the second opening 10359 from the first face 10355 to the second face 10357 of the second plate 10351, such that the metal contacts on the second end 10393 of the flexible assembly 1039 are located on the second face 10357 of the second plate 10351. More specifically, as shown in FIG. 3*b*, the second end 10393 of the flexible assembly 1039 is accommodated in the second accommodating groove 10361 on the second face 10357 of the second plate 10351, and the metal contacts on the second end 10393 are exposed to the outside of the second plate 10351 in the second accommodating groove 10361.

As shown in FIG. 3*c*, the first plate 10331 is provided with a first recess 10343 at the other end opposite the end provided with the three sleeves on the first face 10335, and the second plate 10351 is provided with a second recess 10363 at the other end opposite the end provided with the two sleeves on the first face 10355.

As shown in FIGS. 2 and 4, the connection ports 105 are provided on the lamp panel 101 in the form of insertion slots. More specifically, the connection ports are provided on edges of the back plate 1013, and the openings of the insertion slots face the outer side of edges of the back plate 1013, so as to facilitate insertion of connection portions of connectors into the openings of the insertion slots. FIG. 2 shows that each lamp unit is in a triangular shape, and three connection ports 105 are respectively provided on three edges of a triangular back plate of the lamp unit; however, the present disclosure is not limited thereto, and the lamp unit may be in other shapes such as a quadrangular shape, a pentagonal shape and a hexagonal shape, and the number of connection ports may also be set according to requirements. FIG. 2 shows a situation in which the connection ports 105 are provided on the back plate 1013, but the present disclosure is not limited thereto. It can be contemplated that the connection ports may also be provided, in a manner similar to USB interfaces, on side faces of the lamp panel 101 which connect the light-emitting plate 1011 and the back plate 1013.

FIG. 5 shows a sectional view taken along the horizontal direction from the center of the connection port as shown on the right side of FIG. 4. As shown in FIGS. 4 and 5, metal springs 1051 are provided on the back plate 1013 inside the connection port 105, and the metal springs 1051 are electrically connected to circuit components arranged between the light-emitting plate 1011 and the back plate 1013. The inner wall of the connection port 105 opposite the back plate 1013 is provided with a bump 1053 and a warping piece 1055 located outside the bump 1053.

When the connection port 105 is connected to one of the first connection portion 1033 and the second connection portion 1035, the bump 1053 on the connection port 105 is snap-fitted with the first recess 10343 or the second recess 10363, and the metal springs 1051 are electrically coupled to the metal contacts on the first connection portion 1033 or the second connection portion 1035. Specifically, as shown in FIG. 4, when the first connection portion 1033 of the connector 103 is inserted into the connection port 105, the bump 1053 on the connection port 105 is snap-fitted with the first recess 10343, and the metal springs 1051 are electrically coupled to the metal contacts on the first connection portion 1033.

When detaching the first connection portion 1033 or the second connection portion 1035 from the connection port 105, the snap-fit connection between the bump 1053 and the first recess 10343 or the second recess 10363 is separated by lifting the warping piece 1055 upward. Specifically, as shown in FIG. 4, when the first connection portion 1033 is to be detached from the connection port 105, the snap-fit connection between the bump 1053 and the first recess 10343 is separated by lifting the warping piece 1055 upward, such that the first connection portion 1033 is detached from the connection port 105.

The content above describes a situation in which the bump is provided on the connection port and the recess is provided on the connector, such that the connector and the connection port are connected in a snap-fit manner, but the present disclosure is not limited thereto. For example, the bump may also be provided on the connector and the recess may be provided on the connection port, to achieve the snap-fit connection between the connector and the connection port.

Thus, quick assembly and quick disassembly between the connector and the connection port can be achieved.

As shown in FIGS. 3*a*-3*c*, the connector 103 may be further provided with screw holes. Specifically, the first plate 10331 is provided with a first screw hole 10345 at the end where the first recess 10343 is provided, and the second plate 10351 is provided with a second screw hole 10365 at the end where the second recess 10363 is provided. For example, screws can pass through the screw holes, to stably fix assembled lamp units to a predetermined location, such as a wall surface.

In the present embodiment, the first connection portion is provided with three sleeves, the second connection portion is provided with two sleeves, and the sleeves of the first connection portion and the sleeves of the second connection portion are embedded with one another in a crossed manner, which increases the contact area between the sleeves of the first connection portion and the second connection portion, and increases the rotation damping of the first connection portion and the second connection portion rotating around the rotating shaft, so that when three-dimensional assembling is performed on a plurality of lamp units, a three-dimensional stereoscopic shape can be maintained persistently and stably, thereby achieving an excellent three-dimensional assembling effect.

By further providing gaskets between the ends of the rotating shaft and the outermost sleeves of the first connection portion, the rotation damping of the first connection portion and the second connection portion rotating around the rotating shaft can be further increased, so that when three-dimensional assembling is performed on a plurality of lamp units, a three-dimensional stereoscopic shape can be further stably maintained.

By means of the snap-fit connection between connectors and connection ports, secure connection between the lamp units is achieved. For example, due to secure snap-fit connection between connectors and connection ports, when planar assembling is performed on lamp units, first, all lamp units requiring planar assembling may be connected in a snap-fit manner to form a desired planar pattern on a table top for example, and then the assembled planar pattern is mounted to a predetermined position, for example, a wall surface. In this process, an operator does not need to repeatedly climb a ladder or the like to assemble and mount the lamp units, so that the assembling and mounting operations of the lamp units are easier, increasing the working efficiency.

By means of the screw holes provided on the connectors, the lamp units can be suspended to a predetermined position by using screws passing through the screw holes, thereby stabilizing the connection between the lamp units and the predetermined position (e.g., a wall surface). In addition, as the hinge structure of the connector can maintain a stable predetermined angle between the first connection portion and the second connection portion, after the planar pattern formed by assembling the lamp units is fixed to the predetermined position by using screws, the angle between the first connection portion and the second connection portion on each lamp unit at the edges of the planar pattern can be adjusted, so as to hide the screws behind the planar pattern, thereby improving the aesthetic appearance of the assembled lamp units.

Figure 6:
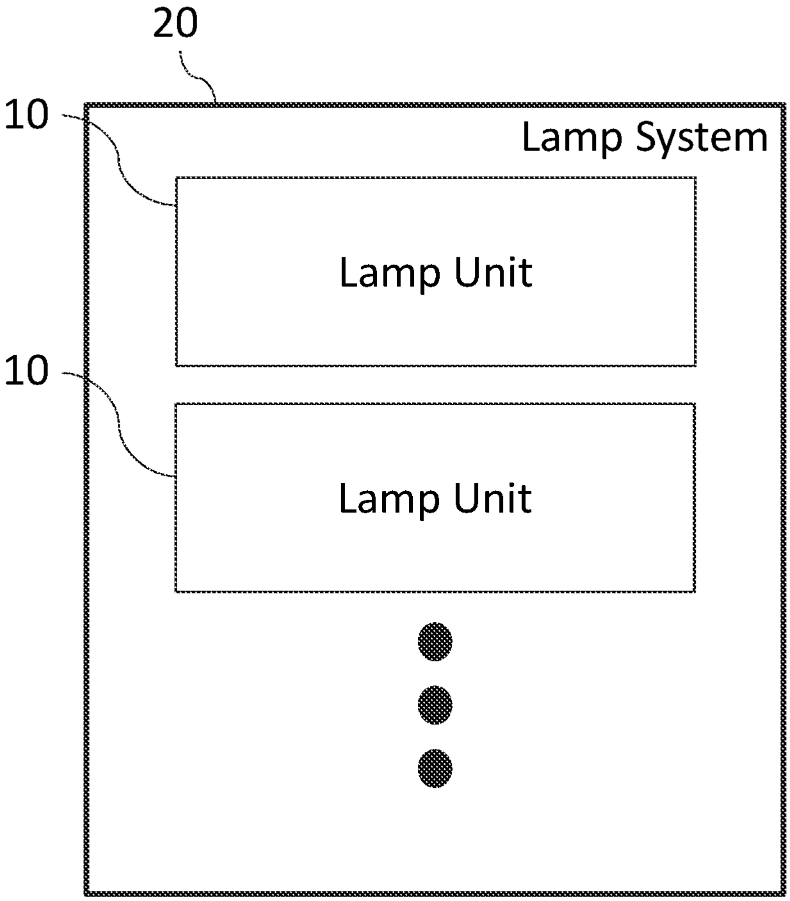
FIG. 6 shows a block diagram of a lamp system according to another embodiment of the present disclosure.
Figure 7A:
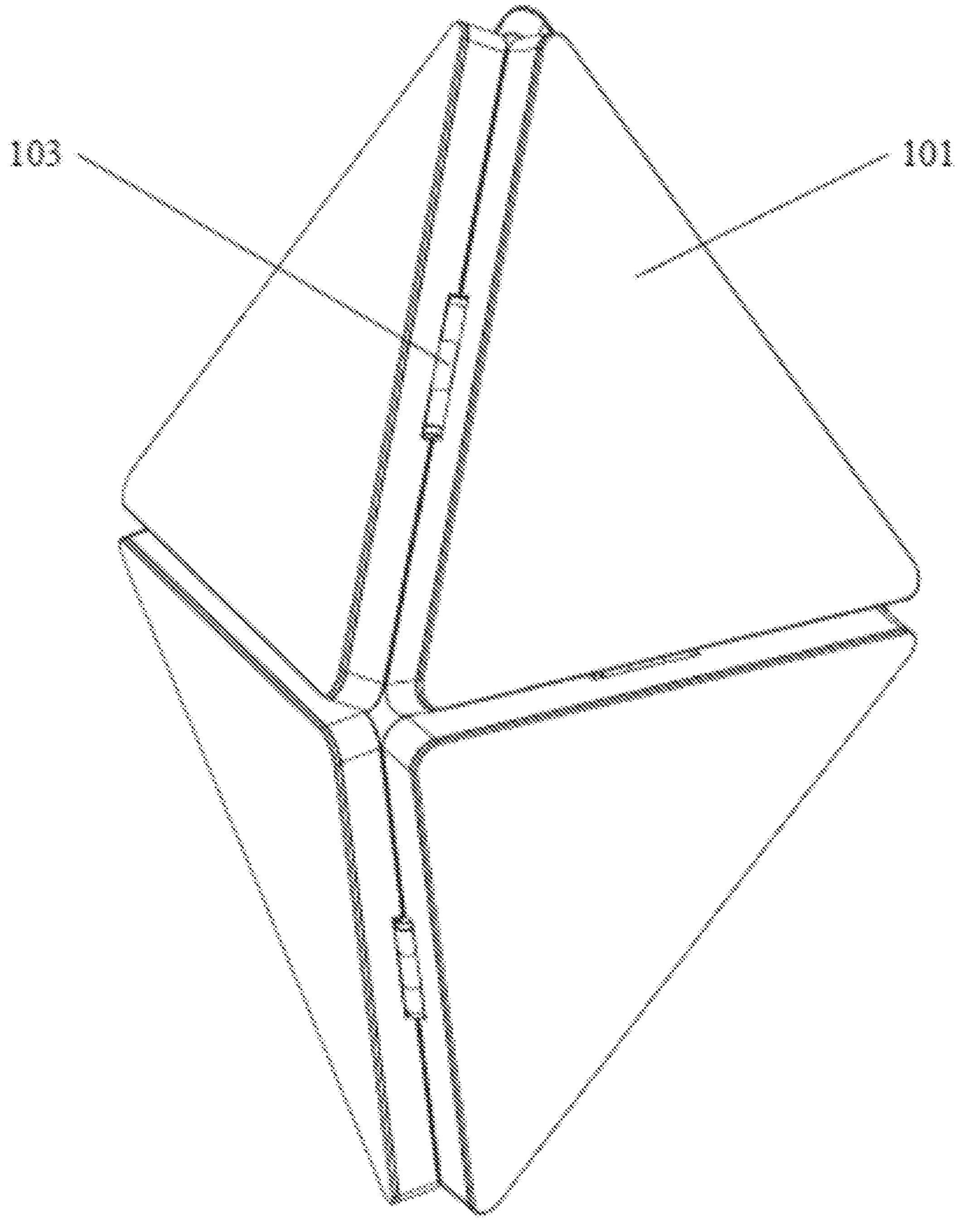
FIGS. 7*a*-7*b* show an effect diagram of a lamp system according to another embodiment of the present disclosure.
Figure 7B:
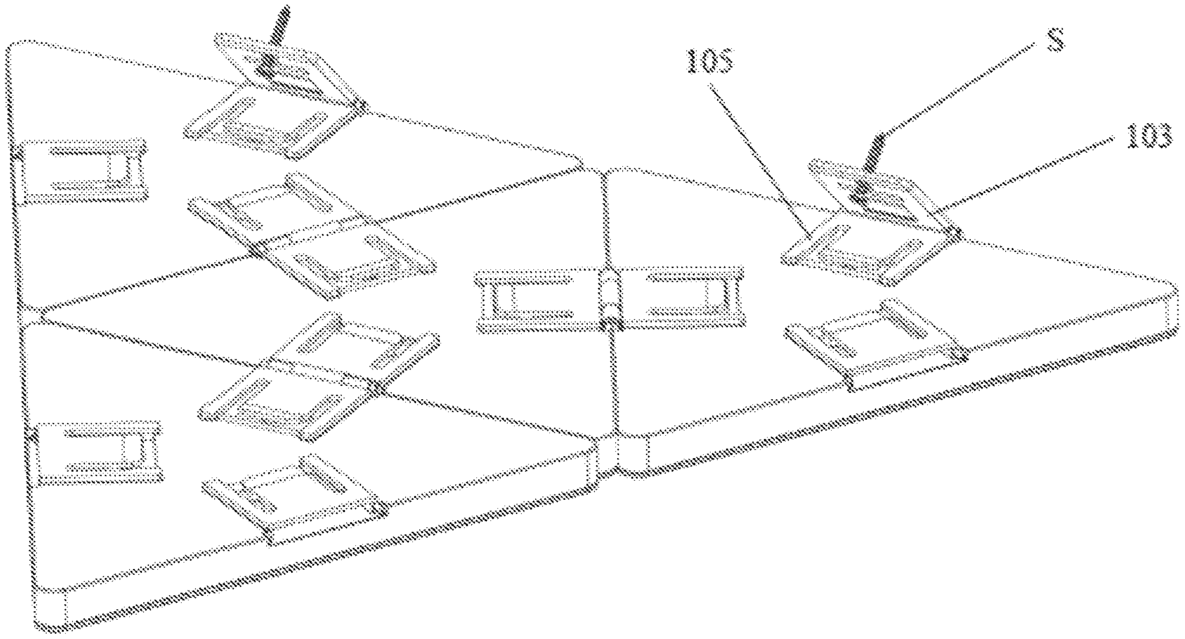

In accordance with another embodiment of the present disclosure, a lamp system is provided. FIG. 6 shows a block diagram of a lamp system according to another embodiment of the present disclosure. FIG. 7*a* and FIG. 7*b* show an effect diagram of a lamp system according to another embodiment of the present disclosure, in which FIG. 7*a* is a stereoscopic assembling effect diagram of lamp units, and FIG. 7*b* is a planar assembling effect diagram of lamp units. Hereinafter, the lamp system according to another embodiment of the present disclosure is described in combination with FIGS. 6-7.

As shown in FIG. 6, the lamp system 20 comprises a plurality of lamp units 10, each lamp unit comprising: a lamp panel; a connector, the connector comprising: a rotating shaft; and a first connection portion and a second connection portion, the first connection portion and the second connection portion being sleeved on the rotating shaft in a hinge form and being rotatable relative to each other around the rotating shaft; and connection ports, provided on the lamp panel and configured to be detachably snap-fitted with one of the first connection portion and the second connection portion, wherein the plurality of lamp units are connected to one other by means of the connectors.

It should be noted here that the specific structure of each lamp unit 10 in the lamp system 20 is completely the same as the structure described in conjunction with FIGS. 1-5. In order to avoid obscuring the present disclosure due to excessive description, the specific structure of the lamp unit 10 will not be repeated herein.

In the lamp system 20, by adjusting the angle between the first connection portion and the second connection portion of each lamp unit, for example, a stereoscopic assembling effect of the lamp units as shown in FIG. 7*a* and a planar assembling effect of the lamp units as shown in FIG. 7*b* can be achieved.

In the stereoscopic assembling of lamp units as shown in FIG. 7*a*, the connectors of the lamp units have enhanced rotation damping and a secure snap-fit connection exists between the connectors and the connection ports, and thus the angles between the lamp units can be adjusted as required to obtain a desired three-dimensional stereoscopic shape, and the three-dimensional stereoscopic shape can be maintained persistently and stably at the same time.

In the planar assembling of lamp units as shown in FIG. 7*b*, the connectors may be first inserted into the connection ports of the lamp units on a table top for example, and all lamp units (for example, four lamp units) requiring planar assembling are connected in a snap-fit manner to form a desired planar pattern, for example, a triangle; and then screws S may be used to pass through screw holes on the first connection portions or the second connection portions on the edge of the assembled planar pattern, so as to fix the planar pattern to a predetermined position, for example, a wall surface. As the hinge structures of the connectors are firm and reliable, the outermost lamp units can be fixed via screws to suspend the whole assembled planar pattern; and the hinge structures can rotate, and the screws S can be hidden behind the planar pattern, thereby improving the aesthetic appearance of the assembled lamp units.

The lamp system according to another embodiment of the present disclosure can achieve a stable three-dimensional stereoscopic shape and/or convenient planar assembling, so that the light-emitting patterns formed after the lamp units are assembled are more abundant, the light-emitting effect of the lamp units is improved, and the planar assembling of the lamp units is more convenient.

In the embodiments of the present disclosure, the description of each embodiment has its own emphasis. For the part not detailed in a certain embodiment, please refer to the relevant description in other embodiments.

The content above only relates to preferred embodiments of the present disclosure. It should be noted that for a person of ordinary skill in the art, several improvements and modifications can also be made without departing from the principle of the present disclosure, and these improvements and modifications shall also be considered as within the scope of protection of the present disclosure.

The invention claimed is:

1. A lamp unit, comprising:
a lamp panel;
a connector, the connector comprising:
a rotating shaft; and
a first connection portion and a second connection portion, the first connection portion and the second connection portion being sleeved on the rotating shaft in a hinge form and being rotatable relative to each other around the rotating shaft; and
connection ports, provided on the lamp panel and configured to be detachably snap-fitted with one of the first connection portion and the second connection portion.

2. The lamp unit according to claim 1, wherein
the first connection portion and the second connection portion each comprise sleeves for accommodating the rotating shaft.

3. The lamp unit according to claim 2, wherein
the first connection portion comprises:
a first plate; and
n sleeves, spaced apart at predetermined intervals and arranged on one end of the first plate, the first connection portion being sleeved on the rotating shaft via the n sleeves,
and the second connection portion comprises:
a second plate; and
n−1 sleeves, spaced apart at predetermined intervals and arranged on one end of the second plate, wherein the n−1 sleeves are sleeved on the rotating shaft in a manner of being respectively embedded in n−1 intervals formed by the n sleeves of the first connection portion,
where n is greater than or equal to 3.

4. The lamp unit according to claim 3, wherein
the connector further comprises gaskets arranged between ends of the rotating shaft and the outermost sleeves of the n sleeves of the first connection portion.

5. The lamp unit according to claim 3, wherein
the first plate has a first face and a second face opposite each other and has a first opening in the middle of the plate, and the second plate has a first face and a second face opposite each other and has a second opening in the middle of the plate, the connector further comprises a flexible assembly, wherein a first end and a second end of the flexible assembly are respectively provided with metal contacts, wherein the first end of the flexible assembly passes through the first opening from the first face of the first plate to the second face of the first plate, so that the metal contacts on the first end of the flexible assembly are located on the second face of the first plate, and the second end of the flexible assembly passes through the second opening from the first face of the second plate to the second face of the second plate, so that the metal contacts on the second end of the flexible assembly are located on the second face of the second plate.

6. The lamp unit according to claim 5, wherein each of the connection ports comprises metal springs provided therein, and when the connection port is connected to one of the first connection portion and the second connection portion, the metal springs are electrically coupled to the metal contacts on the first connection portion or the metal contacts on the second connection portion.

7. The lamp unit according to claim 5, wherein a first accommodating groove closely adjacent to the first opening is provided on the second face of the first plate, for accommodating the first end, passing through the first opening, of the flexible assembly, and a second accommodating groove closely adjacent to the second opening is provided on the second face of the second plate, for accommodating the second end, passing through the second opening, of the flexible assembly.

8. The lamp unit according to claim 5, wherein the first plate is provided with a first recess at the other end opposite the end provided with the n sleeves on the first face, the second plate is provided with a second recess at the other end opposite the end provided with the n−1 sleeves on the first face, and the connection port is provided with a bump, and when the connection port is connected to one of the first connection portion and the second connection portion, the bump is snap-fitted with the first recess or the second recess.

9. The lamp unit according to claim 8, wherein the connection port is further provided with a warping piece located outside the bump, and when detaching the first connection portion or the second connection portion from the connection port, snap-fit connection between the bump and the first recess or the second recess is separated by lifting the warping piece upward.

10. The lamp unit according to claim 8, wherein the first plate is provided with a first screw hole at the end where the first recess is provided, and the second plate is provided with a second screw hole at the end where the second recess is provided.

11. The lamp unit according to claim 1, wherein the lamp panel comprises:

a light-emitting plate; and a back plate, arranged opposite the light-emitting plate, wherein the connection ports are provided on the back plate.

12. A connector, comprising:

a rotating shaft;

a first connection portion and a second connection portion, the first connection portion and the second connection portion being sleeved on the rotating shaft in a hinge form and being rotatable relative to each other around the rotating shaft; and metal contacts, provided on the first connection portion and the second connection portion, respectively, wherein the first connection portion comprises:

a first plate; and n sleeves, spaced apart at predetermined intervals and arranged on one end of the first plate, the first connection portion being sleeved on the rotating shaft via the n sleeves, and the second connection portion comprises:

a second plate; and n−1 sleeves, spaced apart at predetermined intervals and arranged on one end of the second plate, wherein the n−1 sleeves are sleeved on the rotating shaft in a manner of being respectively embedded in n−1 intervals formed by the n sleeves of the first connection portion, where n is greater than or equal to 3.

13. The connector according to claim 12, wherein the connector further comprises gaskets arranged between ends of the rotating shaft and the outermost sleeves of the n sleeves of the first connection portion.

14. The connector according to claim 12, wherein the first plate has a first face and a second face opposite each other and has a first opening in the middle of the first plate, and the second plate has a first face and a second face opposite each other and has a second opening in the middle of the second plate, the connector further comprises a flexible assembly, wherein a first end and a second end of the flexible assembly are respectively provided with metal contacts, wherein the first end of the flexible assembly passes through the first opening from the first face of the first plate to the second face of the first plate, so that the metal contacts on the first end of the flexible assembly are located on the second face of the first plate, and the second end of the flexible assembly passes through the second opening from the first face of the second plate to the second face of the second plate, so that the metal contacts on the second end of the flexible assembly are located on the second face of the second plate.

15. The connector according to claim 14, wherein a first accommodating groove closely adjacent to the first opening is provided on the second face of the first plate, for accommodating the first end, passing through the first opening, of the flexible assembly, and a second accommodating groove closely adjacent to the second opening is provided on the second face of the second plate, for accommodating the second end, passing through the second opening, of the flexible assembly.

16. The connector according to claim 14, wherein the first plate is provided with a first recess at the other end opposite the end provided with the n sleeves on the first face, and the second plate is provided with a second recess at the other end opposite the end provided with the n−1 sleeves on the first face.

17. The connector according to claim 16, wherein the first plate is provided with a first screw hole at the end where the first recess is provided, and the second plate is provided with a second screw hole at the end where the second recess is provided.

18. A lamp system, comprising a plurality of lamp units, each of the lamp units comprising:

a lamp panel;

a connector, the connector comprising:

a rotating shaft; and a first connection portion and a second connection portion, the first connection portion and the second connection portion being sleeved on the rotating shaft in a hinge form and being rotatable relative to each other around the rotating shaft; and connection ports, provided on the lamp panel and configured to be detachably snap-fitted with one of the first connection portion and the second connection portion, wherein the lamp panels of the plurality of lamp units are connected to one another by means of the connectors.

* * * * *